US005331727A

United States Patent [19]

Golen

[11] Patent Number: 5,331,727

[45] Date of Patent: Jul. 26, 1994

[54] METHOD OF ASSEMBLING COMPONENTS OF A TWO SIDED COLONIAL GRID ASSEMBLY INTO A DOOR, WINDOW OR LIKE CLOSURE

[76] Inventor: Selig Golen, 5137 NW. 93rd Doral Way, Doral Estates, Miami, Fla. 33178

[21] Appl. No.: 964,133

[22] Filed: Oct. 22, 1992

[51] Int. Cl.[5] ........................ B23P 11/02; E06B 3/70; E04C 2/38

[52] U.S. Cl. ..................................... 29/453; 52/311.1; 52/656.2; 52/668; 52/669; 52/456

[58] Field of Search ................. 52/311.1, 311.3, 656.2, 52/664, 668, 669, 776, 204.62, 204.69, 456; 29/453

[56] References Cited

U.S. PATENT DOCUMENTS 1,005,012 10/1911 Forsyth ................................ 52/664
3,504,468 4/1970 Martin .................................. 52/456
3,678,651 7/1972 Hicks .................................... 52/456
4,723,388 2/1988 Zieg ...................................... 52/665
5,040,347 8/1991 Valvis .................................. 52/456

*Primary Examiner*—P. W. Echols
*Attorney, Agent, or Firm*—Malloy & Malloy

[57] ABSTRACT

A method to assemble a two sided colonial grid assembly for a closure and an assembly, such as but not limited to a glass pane door or window wherein the grid structure incorporates both real and false muntin bars as well as integral and false glazing beads. The assembly is structured to allow a snap-fit type of attachment of the glazing beads into the grid assembly and in engagement with the glass panes such that the entire assembly is structured to facilitate and reduce cost of assembling and manufacturing while providing an authenticate and aesthetically pleasing appearance.

3 Claims, 2 Drawing Sheets

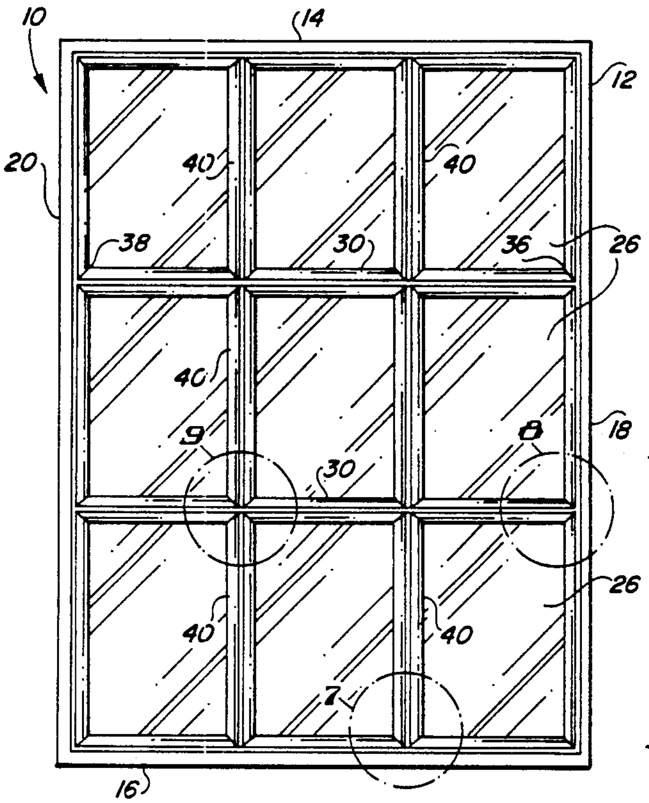
FIG. 1
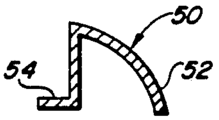
FIG. 2
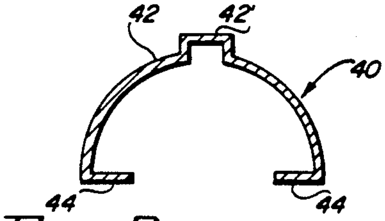
FIG. 3
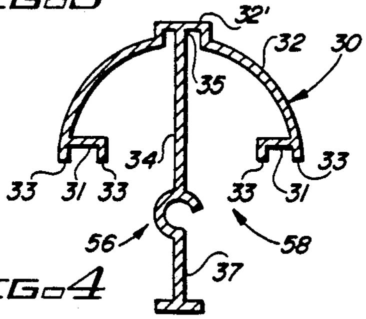
FIG. 4
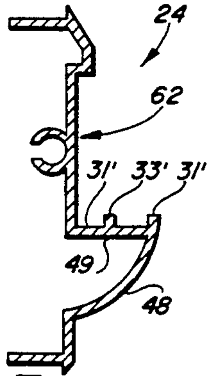
FIG. 5
FIG. 9
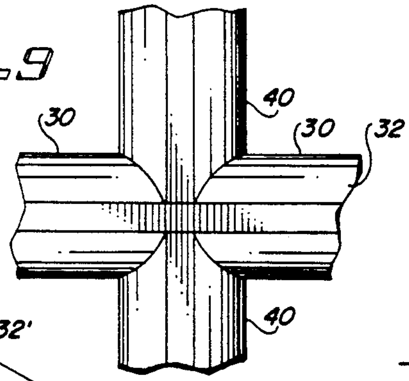
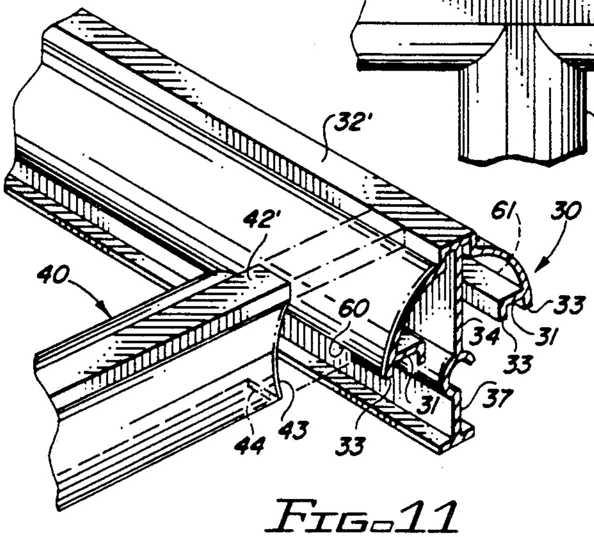
FIG. 11
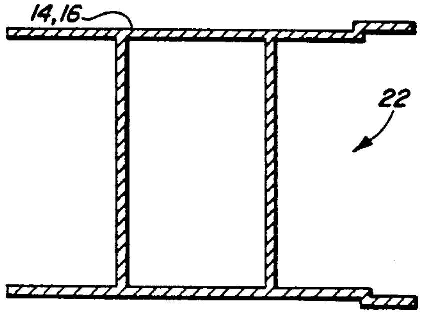
FIG. 6

METHOD OF ASSEMBLING COMPONENTS OF A TWO SIDED COLONIAL GRID ASSEMBLY INTO A DOOR, WINDOW OR LIKE CLOSURE

BACKGROUND OF THE INVENTION

1. Field of the Invention

A method of assembling components of a two sided colonial grid door which reduces cost while providing a door with an authentic colonial grid appearance.

2. Description of the Prior Art

Closures, in the form of both doors and windows incorporate a popular design commonly referred to as a colonial grid. Typically, such a structural configuration is defined by a plurality of panes of glass of substantially equal dimension and configuration surrounded by an outer peripheral frame and/or a plurality of muntin bars or members. While clearly such a structure is aesthetically pleasing, the production and/or assembly of a true colonial grid structure is time consuming and accordingly, very expensive.

Attempts of course have been made in the prior art to simplify construction or assembly techniques in the production of doors or like closures incorporating a colonial grid appearance. To date, there still appears to be a need for an improved assembly and production technique. This is especially true when modern day production facilities are available which are capable of producing a door with an aluminum or like material framing structure capable of resembling a number of contemporary and traditional designs, including but not limited to a colonial grid configuration.

SUMMARY OF THE INVENTION

The present invention relates to a method of assembling components of a two sided colonial grid assembly into a door or like closure assembly.

The method of assembling the colonial grid assembly includes a peripherally disposed support frame, or frame portion, including a) head and sill members disposed respectively at the top and bottom of the frame, as well as b) jamb members disposed along the longitudinal frame sides and further disposed in interconnecting relation between the head and sill portions of the supporting frame, the support frame being disposed in a horizontal attitude for assembly. The frame is formed from an extruded aluminum material and is specifically configured for attachment to other components of the assembly.

Such other components include an attachment bar secured to an inner peripheral edge of the above-noted frame portion and also being formed from an extruded aluminum material. Such attachment bars are structurally configured to include an integrally formed facing extending along the length thereof and disposed in engaging relation with correspondingly positioned glass panes of which the subject closure structure, such as a door, is formed. Further, each of the attachment bars are structurally configured to receive a correspondingly positioned peripheral edge of the glass panes and further structured to also receive a glazing bead, preferably roll formed of aluminum material and itself being structured to snap-fit into engagement in the receiving channel in engaging relation with an opposite side of the glass pane relative to the integral formed bead.

Another component of the subject colonial grid assembly comprises the provision of true muntin bars extending in preferably transversely and spaced apart parallel relation to one another along the length of the closure wherein each true muntin bar includes a facing portion and an outwardly extending transversely oriented mounting web. The facing portion is disposed on one of two opposite sides of the assembled glass panes wherein the mounting web is of sufficient length to extend between adjacently positioned glass panes and extend outwardly therefrom to an opposite side of the glass panes relative to the facing portion. The protruding portion of the mounting web also defines receiving channels on opposite sides thereof. Each of these receiving channels is also configured to receive a formed aluminum material glazing bead in snap-fitted engagement with the web and the correspondingly positioned and received supported glass pane.

The assembly method for the two sided colonial grid assembly is essentially completed through the provision of false muntin bars externally configured in a substantially equivalent appearance as the facing portions of the true muntin bars. The false muntin bars are disposed in perpendicular relation to the facing portions of the adjacent true muntin bars and in spaced apart parallel relation to one another. The resulting product of the assembled components has the appearance is of a true colonial grid assembly wherein a plurality of elongated glass panes are effectively divided, at least in appearance, by surrounding framing portions on both of two opposite surfaces thereof. In inter-fitting and cooperative structure of the true muntin bars, false muntin bars and glazing beads along with the attachment bars secured to the peripheral frame serves to facilitate ease of assembly and reduce the cost of production.

The structure and configuration of the components facilitate ease of assembly and the reduction of cost because the frame is formed of the interconnected header joints and sill members and almost all of the components interconnected on a worktable while remaining flat, whereupon the assembly is "flipped" and the remaining components assembled.

It will be appreciated that the colonial divisions of glass are not reduced in size so far as appearance is concerned. However, the actual number of pieces of tempered glass are substantially reduced. For example, in the embodiment shown in FIG. 1 and to be described in greater detail hereinafter, fifteen panels or light zones are in reality only five elongated laterally extending co-planar panels. This achieves a substantial labor cost reduction method and in many cases makes certain jobs possible because in the past, tempered glass has been limited to certain size areas because of cost of manufacture and techniques commercially used in the window art.

BRIEF DESCRIPTION OF THE DRAWINGS

For a fuller understanding of the nature of the present invention, reference should be had to the following detailed description taken in connection with the accompanying drawings in which:

FIG. 1 is a front plan view of a closure assembly incorporating the two sided colonial grid assembly of the present invention.

FIG. 2 is a sectional view of a glazing bead structure of the subject assembly.

FIG. 3 is a transverse sectional view of a false muntin bar of the present invention.

FIG. 4 is a transverse sectional view of a true muntin bar of the present invention.

FIG. 5 is a transverse sectional view of an attachment bar of the present invention.

FIG. 6 is a transverse sectional view of head, sill and jamb portions of a peripherally mounted support frame of the present invention.

FIG. 9 is a front plan view along line 9—9 of FIG. 1 in partial cut-away.

FIG. 11 is a perspective view in partial cut-away and section in an exploded form of mating portions of a false muntin bar and a true muntin bar.

Like reference numerals refer to like parts throughout the several views of the drawings.

DETAILED DESCRIPTION OF THE PREFERRED EMBODIMENT

Figure 7:
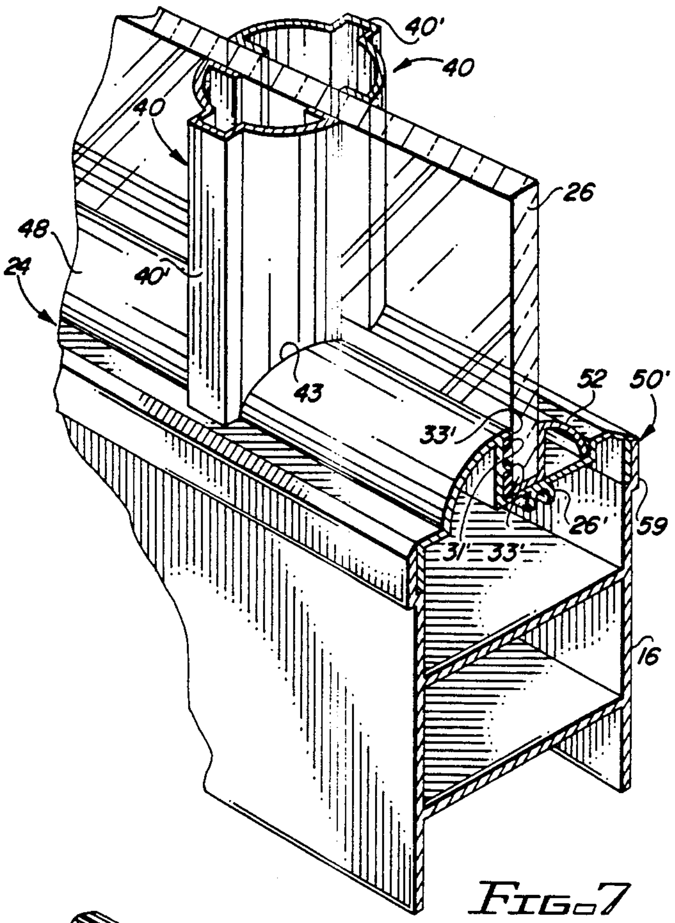
FIG. 7 is a perspective view in partial cut-away and section along the detail indicated by line 7—7 of FIG. 1.
Figure 8:
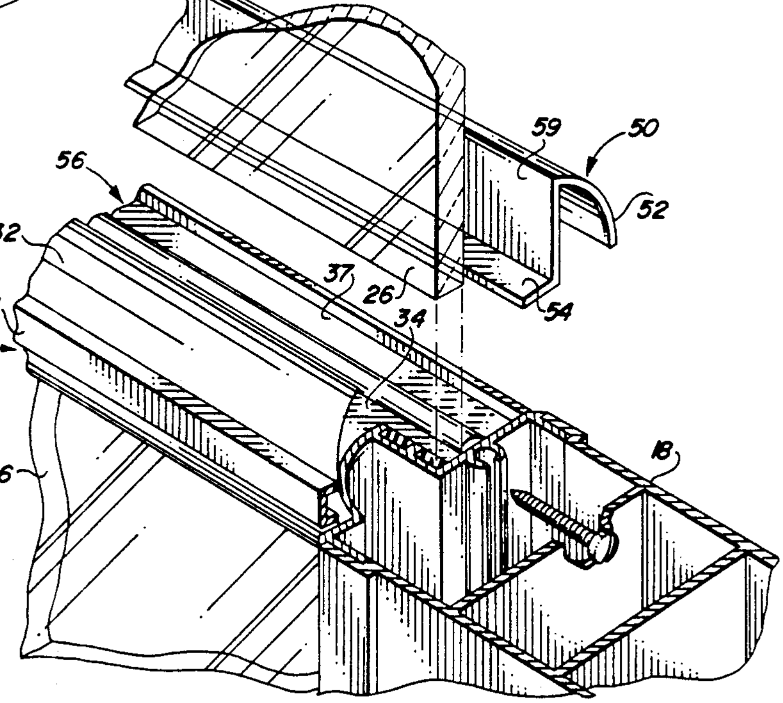
FIG. 8 is a perspective view in partial cut-away and section of a detail view along line 8—8 of FIG. 1.

A closure assembly such as a door or the like incorporating the two sided colonial grid assembly of the present invention is shown in FIG. 1 and generally represented as 10. Before describing the structure and configuration of each of the components of the colonial grid assembly, it may be helpful to describe, first, their relationships in assembly and the actual assembly of them. The components include: a) peripheral frame members, jambs 18 and 20, and header and sill members 14 and 16, which are seen in cross-section in FIG. 6; b) peripheral attachment bars 24, shown in cross-section in FIG. 5, one of which is received in the track opening 22, see FIG. 6, of the jamb, header and sill respectively; and c) true muntin bars, 30, seen in cross-section in FIG. 4 which laterally span the peripheral attachment bars 24 received in the track openings 22 of the jambs, 18 and 20 as shown in the plan view of FIG. 1. After these three types of components have been connected together in a flat assembly on a work surface, d) elongated glass panes 26 are positioned supportingly on co-planar surfaces defined by faces of the attachment bars 24 and true muntins 30. Each of the panes extend between the jambs 18 and 20 in parallel spaced co-planar relation. After the panes 26 have been positioned on the assembly, e) spaced false muntin bars 40 vertically span the laterally extending true muntin bars 30. When this assembly has been secured together, the assembly is flipped and additional lengths of vertical false muntin bars 40 are applied to the opposite glass surfaces of the glass panes, 26 in aligned, overlying, and covering relation as shown in FIG. 7. Finally, glazing strips 50, seen in cross-section in FIG. 3, are "popped" into the assembly along each peripheral laterally extending edge of the glass panes, the glazing strips being secured to the attachment bars 24, as seen in FIG. 7 at the lower right hand corner, as designated by the numeral 50 and to the true muntin bars 30 as seen in FIG. 8. The components of the assembly are thus seen to be interconnected in a relatively inexpensive assembly process which provides a strong closure composed of the components.

Referring to the process in more detail, a peripheral frame 12 composed of spaced vertical jambs 18 and 20 are interconnected with spaced header and sill member members 14 and 16 respectively, see FIG. 1. The common cross-section of these members is seen in FIG. 6. Each of these frame members, it is seen, has an open track 22, see FIG. 6, which in assembly face inwardly, the jamb tracks confronting one another in spaced relation and the header and sill tracks confronting one another in spaced relation. The peripheral frame 12, thus formed, is loosely assembled on a flat work surface, as seen in the plan view in FIG. 1.

Figure 10:
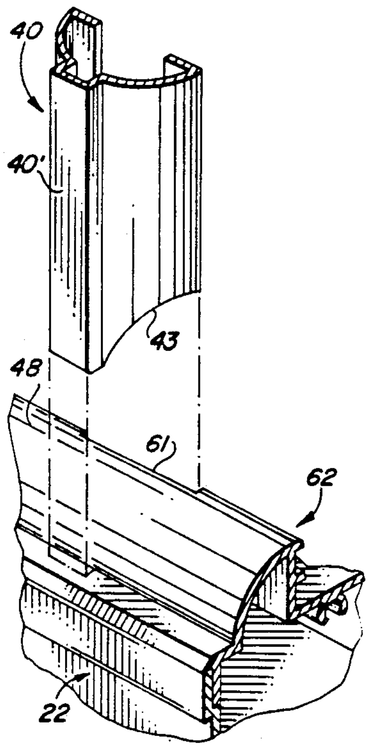
FIG. 10 is a perspective view in partial cut-away and section and in an exploded view of mating portions of a false muntin bar and an attachment bar.

Into the track 22 of each frame member, a peripheral attachment bar 24 is inserted, see FIG. 5. In other words, the attachment bar of FIG. 5, as seen there in cross-section, is moved to the left into the track or opening 22, as seen in the adjacent FIG. 6. As further seen in the plan view of FIG. 1 of the closure assembly, representing the assembly on a horizontal support surface, four laterally extending spaced true muntin bars 30, seen in cross-section in FIG. 4, are provided in spanning relation of the attachment bars 24 in the jambs 18 and 20. Surfaces on the frame members 14, 16, 18, and 20, and the true muntin bars 30 define five rectangular openings each bounded by a co-planar peripheral support surface. Next, five elongated, laterally extending spaced panes of glass 26, appropriately sized, are positioned in co-planar relation on the support surfaces, each glass pane 26 having a sufficient length to extend between the jamb members 18 and 20. Each pane is sized such that its opposing peripheral ends rest on the attachment bars 24 in the space designated by the arrowed line 62 in FIG. 5. The longitudinal peripheral edge of the uppermost and lowermost glass panes, along the header 14 and sill 16 respectively, also rest in the space 62 of the attachment bars 24. While the assembly remains flat, a first plurality of false muntin bars 40 are installed, see FIG. 10 illustrating their attachment of the false muntin bars 40 to the attachment bars 24 and see FIG. 11 illustrating their attachment to the true muntin bars 30. This assembly may then be flipped over exposing the opposite side of the glass panes 26 as shown in FIG. 7, and a second plurality of false muntin bars 40 may be applied in aligned, overlying and confronting relation to the first plurality of false muntin bars 40 already described and resting against the opposite surface of the glass panes 26 (see FIG. 7). Finally, glazing strips, such as 50, seen in cross-section in FIG. 2, and which are of flexible aluminum material, are "popped" into position as designated by the arrowed line 50 at the upper portion of FIG. 8. There is thus assembled a two sided door with a colonial grid appearance. The components will now be further described.

The door is defined by a peripheral frame generally indicated as 12. The peripheral frame 12 comprises a plurality of interconnected components including a head portion 14, a sill portion 16 and oppositely disposed elongated jamb portions 18 and 20. The head and sill, 14 and 16 respectively, are shown in cross-section in FIG. 6 and include one open elongated side or track, generally indicated as 22, see FIG. 6. This track is structured to receive a peripheral attachment bar, to be described in the following paragraph on reference to FIGS. 5, 7 and 10.

The attachment bars 24 have an elongated configuration and extend along and partially within the inner longitudinal side opening tracks 22 of the head 14, sill 16 and jambs 18 and 20 and in receiving, supporting engagement with correspondingly positioned edges of the plurality of glass or like material panes 26, see FIG. 7.

Each of the glass panes 26 have an elongated configuration and extend in substantially parallel co-planar and adjacent or spaced relation to one another transversely across the closure structure 10 as in the preferred embodiment seen in plan in FIG. 1. It should be apparent therefore that the elongated panes 26 have their opposite peripheral ends supported to the jambs 18 and 20 by virtue of their interconnection with correspondingly positioned attachment bars 24.

Another component of the subject colonial grid assembly comprise true muntin bars, see FIG. 4, generally indicated as 30. Each true muntin bar 30 includes an outwardly exposing facing portion 32, See FIGS. 4 and 9, and a transverse outwardly extending mounting web 34. The mounting web 34 is integrally secured to the facing portion 32 and has one end, as at 35, secured to the facing portion as shown in FIG. 4 and the web 34 and other end 37 extend through, that is between the, adjacently positioned edges of glass panes 26 and extending outwardly from the opposite side of each such pane relative to the facing portion 32. The true muntin bars 30 extend in spaced, parallel relation to one another and transversely, that is across the length of the closure 10, as shown in FIG. 1. Further, the true muntin bars 30 have their opposite ends 36 and 38, matingly configured and structured to be interconnected to the jamb portions 18 and 20 respectively of the peripheral support frame 12 as best shown in FIG. 1. Other structural features of the true muntin bar 30 as represented in FIGS. 4 and 11 include elongated channels 31 in which caulking or like sealant material is placed for the sealing engagement with correspondingly positioned surfaces of the glass panes 26. In addition, each of the channels 31 are bordered along their length by outwardly extending elongated flanges 33 wherein the flanges 33 extend outwardly in equal distance so as to concurrently engage the corresponding surface of the pane along with the caulking or sealant within the channels 31, this facilitates against leakage or breakage of the glass pane so engaged. Further, the terminal ends of these flanges are coplanar with the support surfaces of the attachment bars and also comprise support surfaces of the glass panes 26. The similar surface included in the attachment bar generally indicated as 24 is designated 33′ and shown in detail in FIG. 5. In other words, each attachment bar includes one face 49, see FIG. 5, having on the opposite surface two channels such as 31′ in which caulking or like sealant material is supplied for confronting engagement with the corresponding surface of the glass pane 26. Elongated ridges or flanges 33′ extend along the length thereof and are co-planar as indicated for stable confronting engagement with the corresponding surface of the pane 26 and for supporting the glass panes in assembly.

Another component of the subject assembly includes the false muntin bars 40, seen in cross-section in FIG. 3, which also may be formed from aluminum material. Each of these bars include an outer exposed facing portion 42, 42′ substantially identical in appearance to the facing portion 32, 32′, see FIG. 4, of the true muntin bars 30. As shown in FIG. 3, false muntin bars 40 have the co-planar flanges 44 disposed in engaging, confronting relation with the opposite surfaces of the adjacent glass panel 26 respectively and their opposite spaced longitudinal ends structured and configured to matingly and abuttingly connect to either an integrally formed facing 48 on the attachment bar 24, see FIG. 7, or the exposed facing portion 32 on the true muntin bar 30 (see FIG. 9). Also, the opposite ends of each of the false muntin bars 40 may include appropriately curved slots or cut out portions 43 to receive the curved facing of the above-noted integral facings or true muntin bars and attachment bars (see FIGS. 7, 10 and 11). This also forms an end on each such bar which is matingly received in notch 61, see FIG. 10 of the attachment bar 24 and the notch 60 of the true muntin bar, see FIG. 11.

The final component are glazing beads 50, see FIG. 2. These are preferably roll formed from an aluminum material and specifically structured to have a facing portion 52 substantially identical in configuration and appearance to the facing of the attachment bars 24. In addition, the roll forming of the glazing bead 50 allows it to be flexible to a certain extent. Accordingly, it can be handled or manipulated when the colonial grid assembly is being formed on a work surface or when being installed. The glazing bead 50 further includes a receiving flange as at 54 which is designed to fit beneath and in engagement with a peripheral edge of the pane 26, see FIG. 8, as it is "snap-fitted" in appropriate position in receiving channels formed both on the mounting web of the true muntin bars 30 or the attachment bar 24. With regard to FIG. 4, the first and second receiving channel, generally indicated as 56 and 58 (see FIG. 4), are formed on opposite sides of the mounting web 34 and specifically are cooperatively structured with the placement of the individual panes 26 each to receive one glazing bead 50 therein. With reference to FIG. 8, it is seen that one of the first and second receiving channels, as at 56, on one side of the mounting web 34 is disposed and structured to receive the periphery of the pane 26 in a manner such that the receiving flange 54 of the glazing bead 50 is effectively sandwiched therebeneath. In such a position, the exposed facing portion 52 of the glazing bead is disposed on the opposite surface of the pane 26 relative to the facing portion 32 and is cooperatively configured so as to be similar in appearance.

The end portion 37 of the web of the true muntin bars 30 resembles the outermost elongated member 32′ on the exposed surface of the facing portion 32 of the true muntin bars 30. In order that both sides of the closure as shown in FIG. 1 appears the same and to have a duplicate colonial grid structure, the false muntin bars 40 also have the elongated surface 42′ similar in appearance, configuration, dimension, etc.

Placement of first and second glazing beads 50 within the first and second receiving channels 56 and 58 will resemble muntin bars on opposite surfaces of the pane 26 as should be apparent with review of FIG. 8. A surface 59 of the glazing beads 50 is disposed in confronting relation with one of the surfaces of the glass pane 26 as also shown in FIG. 8.

With reference to FIG. 7, lower right hand portion, a third glazing bead 50′ is seen, which is identical in structure, dimension and configuration to the first and second glazing beads, as represented in FIG. 2. It is designed to fit within the third receiving channel 62 of the attachment bar 24, see FIG. 5, and extend along the length thereof. The flange 54 of the respective glazing bead as at 50′ will fit beneath the peripheral edge 26′ as shown in FIG. 7 and the confronting surface as at 59 will confront the corresponding surface of the glass pane 26. Similarly, the facing portion 52 is identical in appearance, dimension, configuration, etc. to the facing 48 of the true muntins thereby forming an identical appearance of the colonial grid on both opposite surfaces of the panes 26.

Now that the invention as a structure and process have been described,

What is claimed is:

1. A method of assembling components of a two sided colonial grid assembly into a door or window, wherein said components of said assembly comprise:

a plurality of panes of common size and shape, each pane having a first main face and a second main face being oppositely disposed and bounded by a common peripheral edge, a rectangular frame of interconnected members including a) spaced parallel header and sill members having confronting surfaces and b) a pair of spaced parallel jamb members, said jamb members each having confronting surfaces, each said member defining therebetween a central assembly opening, the confronting surface of each member having a longitudinally extending recess defining a receiving track, a peripheral attachment bar sized and configured to be connected to each member and in each track and to extend between confronting surfaces of connected members, each said attachment bar including a support surface to extend into the central opening and a facing surface to extend away from said central open to said frame, a plurality of spaced parallel true muntin bars, each having longitudinally extending side surface, each being sized and configured to connect to and extend between the jamb members and to divide the central opening into sub-openings, each said true muntin bar having a pair of longitudinally extending support surfaces, one of said pair of supporting surfaces to extend a common distance into a subopening along one side of the true muntin bar and the other pair of said supporting surfaces extending a common distance into the sub-opening along the other side of said muntin bar, a first plurality of false muntin bars mounted on said first main face of said plurality of panes disposed to interconnect adjacent true muntin bars and attachment bars, and all of said support surfaces being sized and configured to be co-planar in assembly, and each support surface being adapted to abut and to support along the peripheral edge of one of said panes about one main pane face and said panes being sized to close said sub-openings, a second plurality of false muntin bars connected between adjacent true muntin bars and attachment bars, and each having a surface to contact the second main face of an associated pane, said second plurality of false muntin bars being sized and configured the same as the first plurality of false muntin bars in each of said second plurality of false muntin bars being adapted to be positioned in aligned, overlying relation to one of the first plurality of false muntin bars, and a plurality of glazing strips having a surface to contact the other main surface of the panes, said glazing strips being flexible, wherein the method of assembling the components comprises the steps of:

first positioning and interconnecting said pair of spaced jambs having confronting surfaces and said head and sill members having confronting surfaces in a horizontal attitude defining a frame on a work surface with a central assembly opening to the frame, connecting a peripheral bar in each track, each of said bars with the support surface of each bar extending a common distance into the central opening, connecting a plurality of true muntin bars each having a support surface between the spaced jambs dividing the central opening into a plurality of sub-openings, which said true muntin support surfaces extending a common distance into said openings, connecting a first plurality of false muntin bars in spaced relation between adjacent true muntin bars and attachment bars, positioning a pane having a peripheral surface in closing relation of each sub-opening with the peripheral surface being supported on said support surfaces, connecting said second plurality of false muntin bars between adjacent true muntin bars and attachment bars and with one of said second plurality of false muntin bars being in aligned, overlying relation to each of the first plurality of false muntin bars and "pop-fitting" glazing strips along each of said attachment bars between adjacent false muntin bars, so that the completed assembly has the appearance of a two-sided colonial grid assembly.

2. The method as set forth in claim 1 wherein the panes are each rectangular and positioning and connecting said true muntin bars to said assembly so as to divide each pane into equi sized and shaped spaces.

3. The method as set forth in claim 1 wherein said attachment bars each includes a notch sized and configured to receive a portion of one of the ends of each true muntin wherein the method includes the step of inserting the portion of each true muntin bar end in one of said notches in assembly.

* * * * *